(12) United States Patent
Rose et al.

(10) Patent No.: US 8,296,092 B2
(45) Date of Patent: Oct. 23, 2012

(54) PLATFORM SPECIFIC TEST FOR COMPUTING HARDWARE

(75) Inventors: Craig Auburn Rose, Round Rock, TX (US); Christopher James Scholl, Farmington, MN (US)

(73) Assignee: International Business Machines Corporation, Armonk, NY (US)

(*) Notice: Subject to any disclaimer, the term of this patent is extended or adjusted under 35 U.S.C. 154(b) by 645 days.

(21) Appl. No.: 12/192,949

(22) Filed: Aug. 15, 2008

(65) Prior Publication Data
US 2010/0042352 A1   Feb. 18, 2010

(51) Int. Cl.
*G01R 3/00* (2006.01)
*G01R 15/12* (2006.01)
*G06F 12/02* (2006.01)
*G06F 12/08* (2006.01)

(52) U.S. Cl. ......... 702/118; 702/117; 702/119; 702/120

(58) Field of Classification Search .......... 702/117, 702/118, 119, 123, 127, 179, 185, 189; 365/201; 703/13, 14; 714/30; 715/781
See application file for complete search history.

(56) References Cited

U.S. PATENT DOCUMENTS

| | | | |
|---|---|---|---|
| 5,604,895 A * | 2/1997 | Raimi | 703/13 |
| 6,002,869 A | 12/1999 | Hinckley | |
| 6,182,245 B1 | 1/2001 | Akin et al. | |
| 6,282,678 B1 | 8/2001 | Snay et al. | |
| 6,314,034 B1 * | 11/2001 | Sugamori | 365/201 |
| 6,421,634 B1 * | 7/2002 | Dearth et al. | 703/14 |
| 6,542,844 B1 | 4/2003 | Hanna | |
| 6,639,861 B2 | 10/2003 | Stief et al. | |
| 6,651,204 B1 * | 11/2003 | Rajsuman et al. | 714/738 |
| 6,662,312 B1 | 12/2003 | Keller et al. | |
| 6,813,751 B2 * | 11/2004 | Kubista | 716/102 |
| 6,829,731 B1 | 12/2004 | LaFauci et al. | |
| 6,829,738 B2 | 12/2004 | Stabenau | |
| 6,871,331 B1 * | 3/2005 | Bloom et al. | 716/102 |
| 6,886,109 B2 | 4/2005 | Olarig et al. | |
| 6,892,154 B1 | 5/2005 | Lee | |
| 6,961,871 B2 * | 11/2005 | Danialy et al. | 714/30 |
| 6,970,816 B1 | 11/2005 | Bryan et al. | |
| 7,113,883 B1 | 9/2006 | House et al. | |
| 7,793,229 B1 * | 9/2010 | Whittaker et al. | 715/781 |

* cited by examiner

*Primary Examiner* — Michael Nghiem
*Assistant Examiner* — Felix Suarez
(74) *Attorney, Agent, or Firm* — Dale F. Regelman; Quarles & Brady LLP

(57) ABSTRACT

A platform specific test for computing hardware and method using same, wherein the method supplies a plurality of test procedures, and provides a computing device to be evaluated, where the computing device comprises (M) physical objects. The method identifies, for each value of (i), an (i)th physical object disposed in the computing device. The method then determines, for each value of (i), if the plurality of test procedures comprises one or more test procedures associated with the (i)th physical object. If, for each value of (i), the plurality of test procedures comprises one or more (i)th test procedures associated with the (i)th physical object, then the method adds, as one or more (i)th test procedures, the one or more test procedures associated with the (i)th physical object to a test algorithm, and saves that test algorithm.

8 Claims, 7 Drawing Sheets

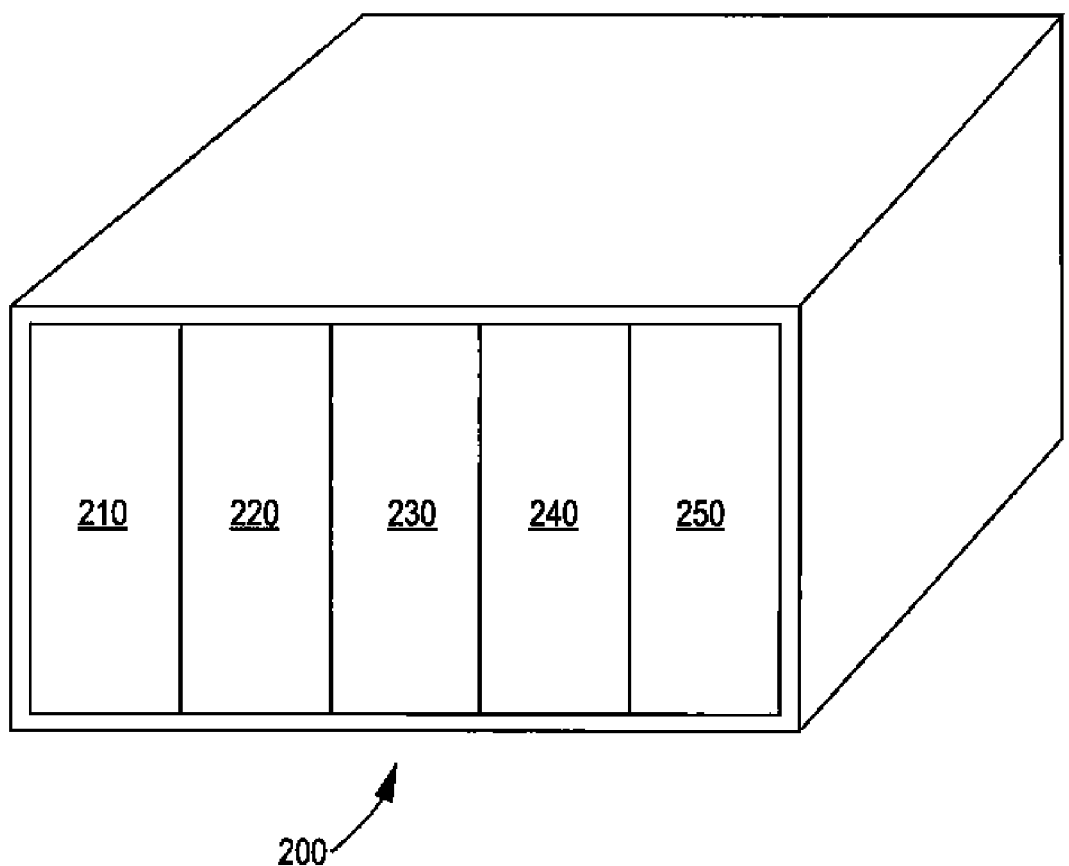

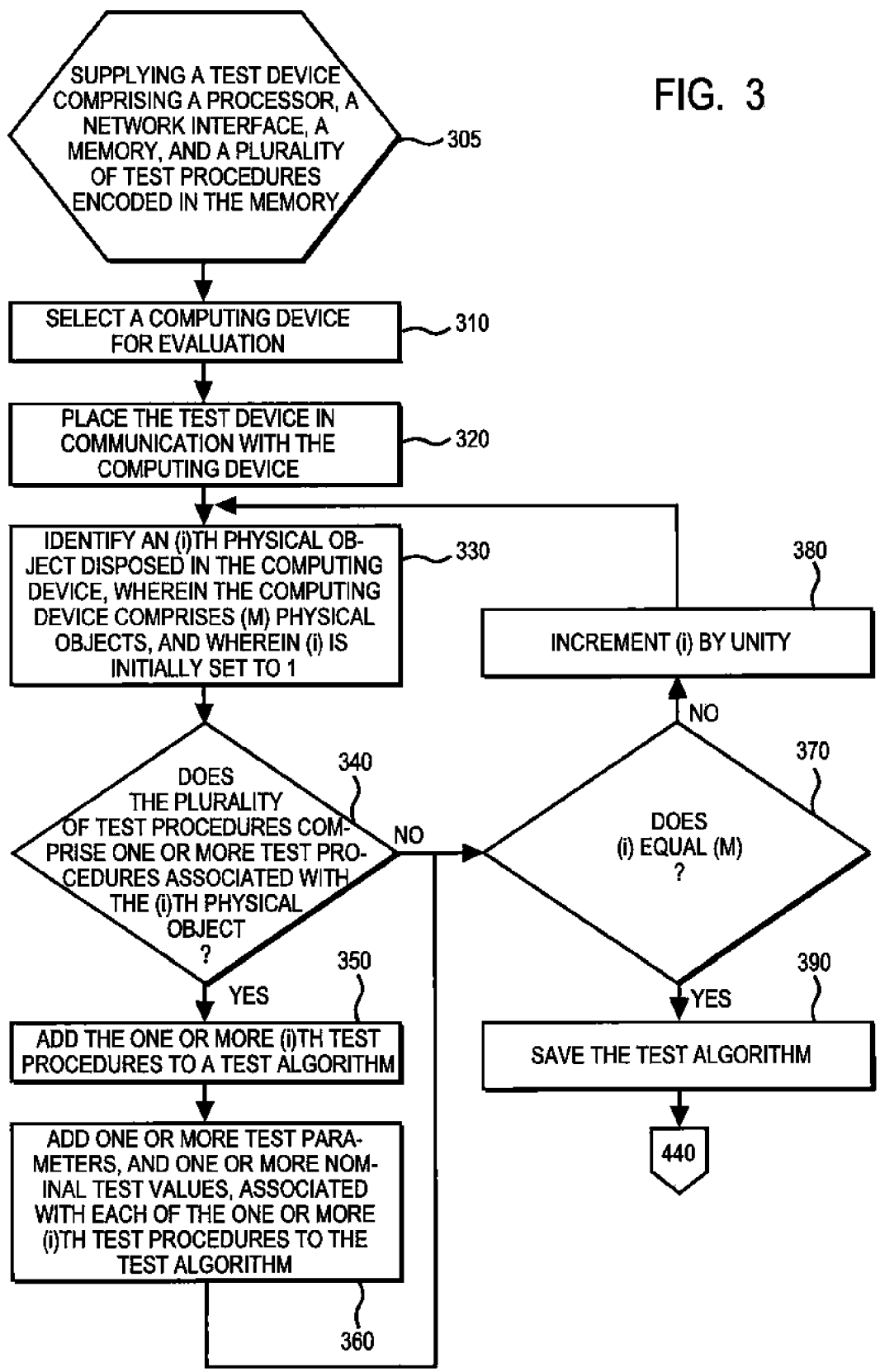

PLATFORM SPECIFIC TEST FOR COMPUTING HARDWARE

FIELD OF THE INVENTION

This invention relates to a platform specific test for computing hardware.

BACKGROUND OF THE INVENTION

Computing devices comprise a plurality of physical objects, i.e. hardware components and systems. For a variety of reasons, it may be necessary or desirable to test that plurality of physical objects. For example, quality assurance/quality control protocols in place at the time of manufacture may require that a newly-manufactured computing device be tested. After being placed in service, a user may elect to periodically test that plurality of physical objects disposed in a computing device as a maintenance protocol. In the event of poor performance and/or a device failure, service technicians may elect to test the plurality of physical objects disposed in the computing device.

SUMMARY OF THE INVENTION

Applicants' invention comprises a platform specific test method for computing hardware. The method supplies a plurality of test procedures, and provides a computing device to be evaluated, where the computing device comprises (M) physical objects, where (M) is greater than or equal to 1.

The method identifies, for each value of (i), an (i)th physical object disposed in the computing device, where (i) is initially set to 1, and where (i) is greater than or equal to 1 and less than or equal to (M). The method then determines, for each value of (i), if the plurality of test procedures comprises one or more test procedures associated with the (i)th physical object.

If, for each value of (i), the plurality of test procedures comprises one or more (i)th test procedures associated with the (i)th physical object, then the method adds to a test algorithm, as one or more (i)th test procedures, the one or more test procedures associated with the (i)th physical object, and saves that test algorithm.

BRIEF DESCRIPTION OF THE DRAWINGS

The invention will be better understood from a reading of the following detailed description taken in conjunction with the drawings in which like reference designators are used to designate like elements, and in which:

FIG. 2A shows a perspective view of one embodiment of Applicants' storage server;

FIG. 3 is a flowchart summarizing the steps of Applicants' method to form Applicants' platform-specific test for computing hardware.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicants' invention comprises a platform specific test for computing hardware. Applicants' method designs a test algorithm that is platform-specific, i.e. a method that first determines a physical configuration for a selected computing device, and then designs a test algorithm to test the hardware components comprising that physical configuration.

In certain embodiments, the selected computing device comprises a data storage library. By "data storage library," Applicants mean an assembly that comprises one or more host computer adapters, one or more processors, one or more data caches, one or more device adapters, and a plurality of data storage devices.

In certain embodiments, the selected computing device comprises a storage server. By "storage server," Applicants mean an assembly comprising one or more networking modules, one or more processor modules, and one or more local data storage device modules.

Figure 1A:
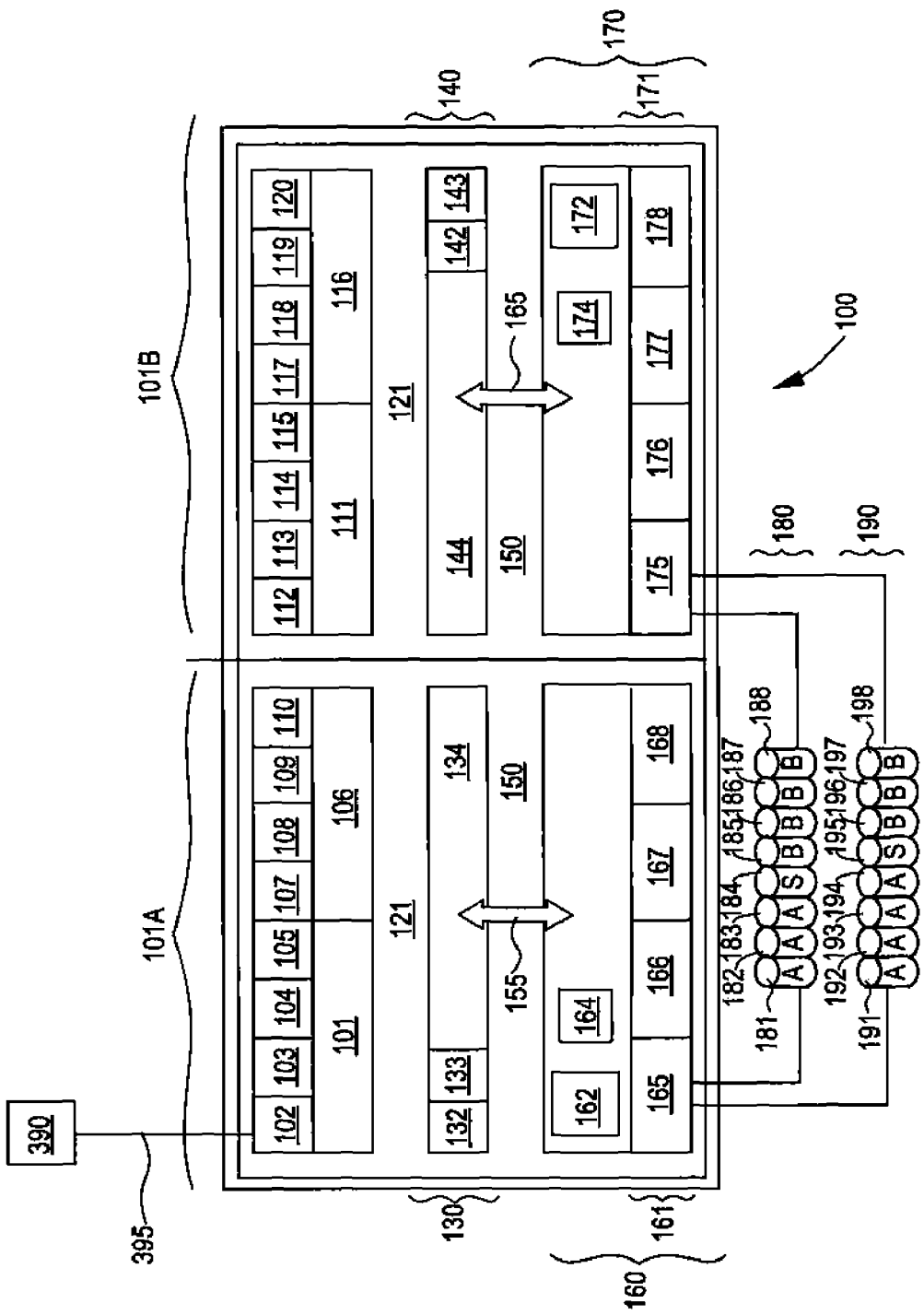
FIG. 1A is a block diagram illustrating one embodiment of Applicants' data storage library.

In certain embodiments, the selected computing device comprises a data storage library, such as data storage library 100 (FIG. 1A). In the illustrated embodiment of FIG. 1A, data storage library 100 comprises a first cluster 101A and a second cluster 101B, wherein clusters 101A and 101B are disposed in the same housing. In the illustrated embodiment of FIG. 1, data storage system 100 comprises a plurality of host adapters 102-105, 107-110, 112-115, and 117-120, disposed in four host bays 101, 106, 111, and 116. In other embodiments, Applicants' data storage system includes fewer than 16 host adapters. Regardless of the number of host adapters disposed in any embodiments of Applicants' system, each of those host adapters comprise a shared resource that have equal access to both central processing/cache elements 130 and 140.

Each host adapter may comprise one or more Fibre Channel ports, one or more Fiber Connector FICON ports, one or more Enterprise Systems Connection ESCON ports, or one or more SCSI ports. Each host adapter is connected to both clusters 101A and 101B through interconnect bus 121 such that each cluster can handle I/O from any host adapter, and such that the storage controller portion of either cluster can monitor the communication path error rate for every communication path, physical and/or logical, interconnected with data storage system 100.

Storage controller portion 130 includes processor 132 and cache 134. In certain embodiments, storage controller portion 130 further includes computer readable medium 133. In certain embodiments, computer readable medium 133 comprises random access memory. In certain embodiments, computer readable medium 133 comprises non-volatile memory.

Storage controller portion 130 further comprises communication path manager 135. In certain embodiments, communication path manager 135 comprises an embedded device disposed in storage controller portion 130. In other embodiments, communication path manager 135 comprises computer readable program code written to computer readable medium 133. Further in the illustrated embodiment of FIG. 1, instructions 136, and physical communication path failure log 138, are written to computer readable medium 133. Processor 132 utilizes instructions 136 to implement the steps of Applicants' method described herein.

Storage controller portion 140 includes processor 142 and cache 144. In certain embodiments, storage controller portion 140 further includes computer readable medium 143. In certain embodiments, computer readable medium 143 comprises random access memory. In certain embodiments, computer readable medium comprises non-volatile memory.

Storage controller portion 140 farther comprises communication path manager 145. In certain embodiments, communication path manager 145 comprises an embedded device disposed in storage controller portion 140. In other embodiments, communication path manager 145 comprises computer readable program code written to computer readable medium 143. Further in the illustrated embodiment of FIG. 1, instructions 146, and physical communication path failure log 148, are written to computer readable medium 143. Processor 142 utilizes instructions 146 to implement the steps of Applicants' method described herein.

I/O portion 160 comprises a plurality of device adapters, such as device adapters 165, 166, 167, and 168. I/O portion 170 further comprises a plurality of device adapters, such as device adapters 175, 176, 177, and 178.

In certain embodiments of Applicants' system, one or more host adapters, storage controller portion 130, and one or more device adapters, are packaged together on a single card disposed in Applicants' data storage system. Similarly, in certain embodiments, one or more host adapters, storage controller portion 140, and one or more device adapters, are disposed on another card disposed in Applicants' data storage system. In these embodiments, Applicants' system 100 includes two cards interconnected with a plurality of data storage devices.

In the illustrated embodiment of FIG. 1, sixteen data storage devices are organized into two arrays, namely array "A" and array "B". The illustrated embodiment of FIG. 1 shows two storage device arrays. In other embodiments, Applicants' data storage system includes more than two storage device arrays. Each storage array appears to a host computer as one or more logical devices.

In certain embodiments, one or more of the data storage devices comprise a plurality of hard disk drive units, such as plurality of disk drive unites 180 and/or 190. In the illustrated embodiment of FIG. 1A, disk array "A" includes disk drives 181, 182, 183, 191, 192, 193, and 194. Disk array "B" includes disk drives 185, 186, 187, 188, 196, 197, and 198. In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and/or reliability that exceeds that of a single large drive.

The illustrated embodiment of FIG. 1A shows two storage device arrays. In other embodiments, Applicants' system includes a single storage device array. In yet other embodiments, Applicants' system includes more than two storage device arrays.

In certain embodiments, the selected computing device comprises a storage server, such as storage server 200 (FIG. 2A). In the illustrated embodiment of FIG. 2A, storage server 200 comprises a power supply module 210, a network communication module 220, a first processor module 230, a second processor module 240, and a data storage module 250.

In certain embodiments, power supply module 210 comprises a substrate, i.e. a "blade," one or more power supplies disposed on that substrate, i.e. a "power supply blade," wherein that power supply blade is removeably disposed within a chassis, i.e. a "blade center." In certain embodiments, network communication module 220 comprises a plurality of network interconnects, one or more communication protocol translators, and the like, disposed on a substrate, i.e. a "network communication blade," wherein that network communication blade is removeably disposed within the blade center.

Figure 2B:
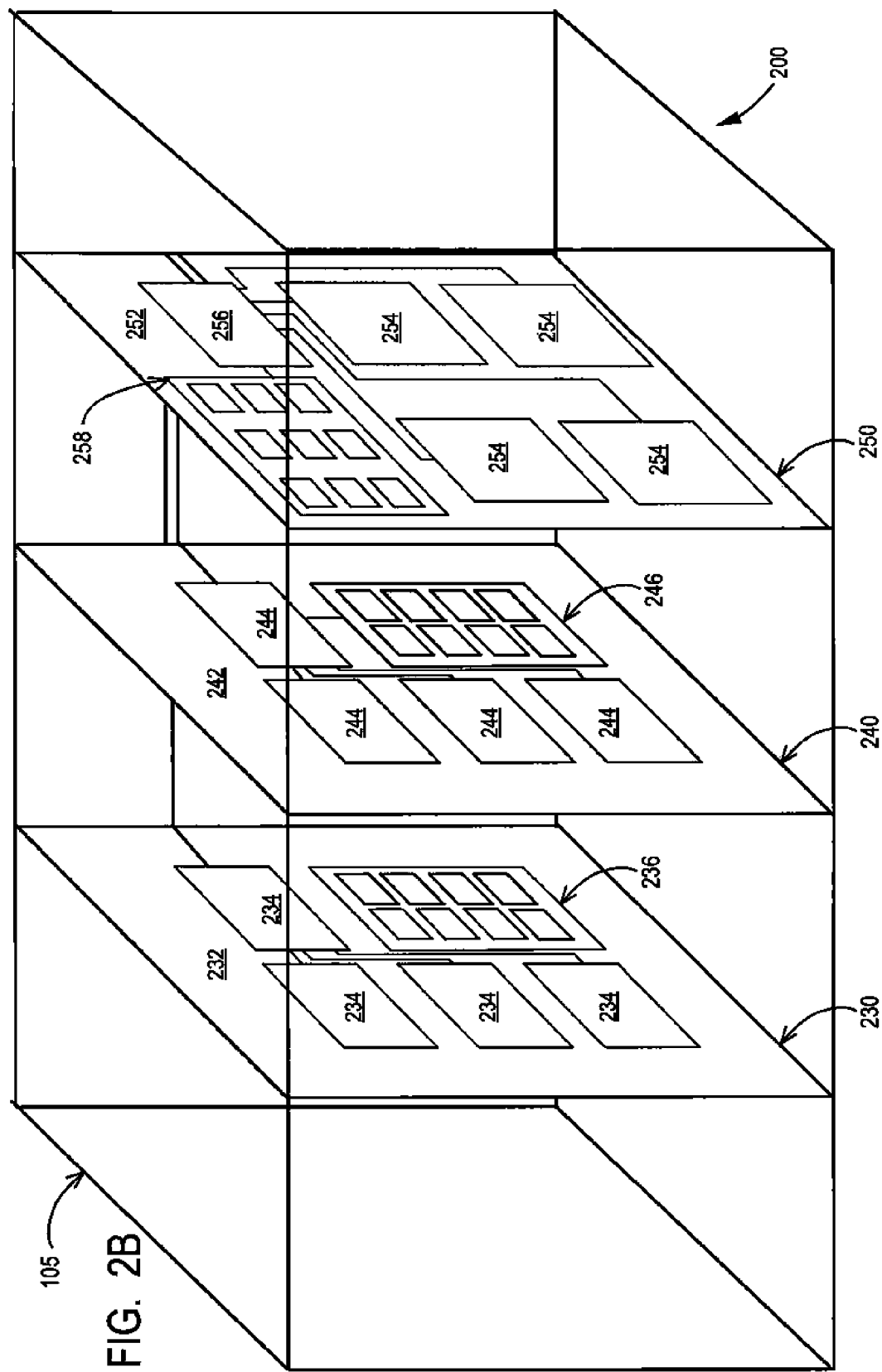
FIG. 2B shows a plurality of modules disposed in the storage server of FIG. 2A.

Referring now to FIGS. 2A and 2B, in certain embodiments, processor module 230 and processor module 240 comprises a substrate 232 and 242, respectively, one or more processor assemblies 234 and 244, respectively, one or more RAM storage assemblies 236 and 246, respectively, and the like, disposed on that substrate, i.e. a "processor blade," wherein each processor blade is removeably disposed within the blade center. In certain embodiments, storage module 250 comprises a substrate, i.e. a "blade," one or more data storage devices disposed on that substrate, i.e. a "storage blade," wherein that storage blade is removeably disposed within the blade center.

Applicants' invention comprises platform specific test for computing hardware. For a variety of reasons, it may be necessary or desirable to test that plurality of physical objects. For example, quality assurance/quality control protocols in place at the time of manufacture may require that a newly-manufactured computing device be tested. After being placed in service, a user may elect to periodically test that plurality of physical objects disposed in a computing device as a maintenance protocol. Moreover, in the event of poor performance and/or a device failure, service technicians may elect to test the plurality of physical objects disposed in the computing device, such as for example and without limitation storage library 100 or storage server 200. Applicants' method designs a testing protocol that is platform-specific, i.e. a method that first determines a physical configuration for a selected computing device, and then designs a test protocol to evaluate the hardware components comprising that physical configuration. FIG. 3 summarizes the steps of Applicants' method.

Referring to FIG. 3, in step 305 the method supplies a test device, such as test device 500 (FIGS. 1B, 2C), comprising a processor, such as processor 510 (FIGS. 1B, 2C), a network interface, such as network interface 580 (FIGS. 1B, 2C), a computer readable medium, such as computer readable medium 530 (FIGS. 1B, 2C), a plurality of test procedures, such as plurality of test procedure 540 (FIG. 1B), encoded in the computer readable medium. Each of the plurality of test procedures is associated with one or more test parameters, such as test parameters 545 (FIGS. 1B, 2C), and with one or more nominal test results, such as nominal test results 550 (FIGS. 1B, 2C), wherein each of those one or more test parameters and each of the one or more nominal test results, are encoded in the computer readable medium disposed in the testing device.

In step 310, the method selects a computing device for testing, wherein that selected computing device comprises (M) physical objects, wherein (M) is greater than or equal to 1. Such physical objects comprise, for example and without limitation, host adapters, device adapters, processors, memory devices, communication buses, storage devices, data caches, and the like.

Figure 1B:
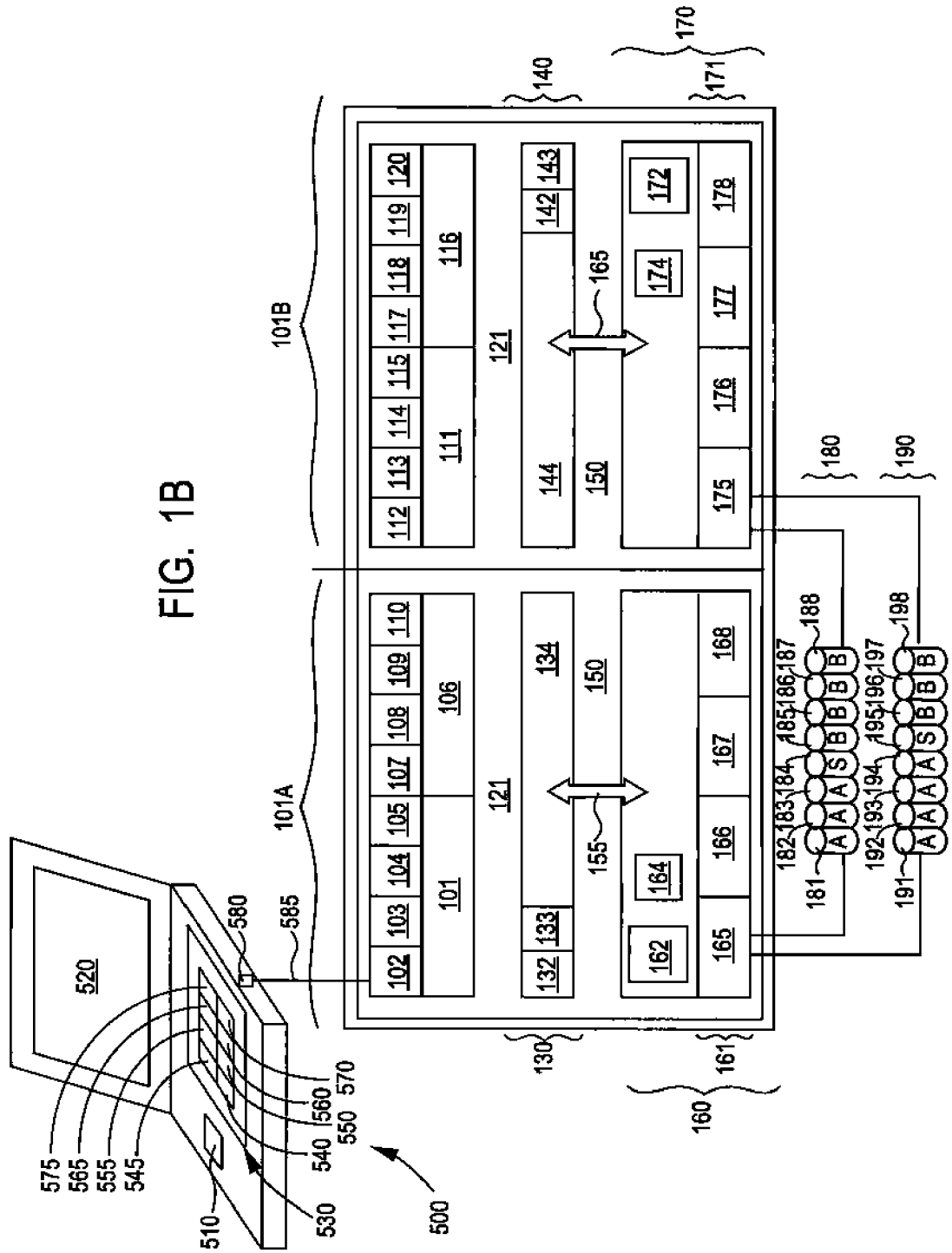
FIG. 1B shows the data storage library of FIG. 1A in communication with Applicants' test device.
Figure 2C:
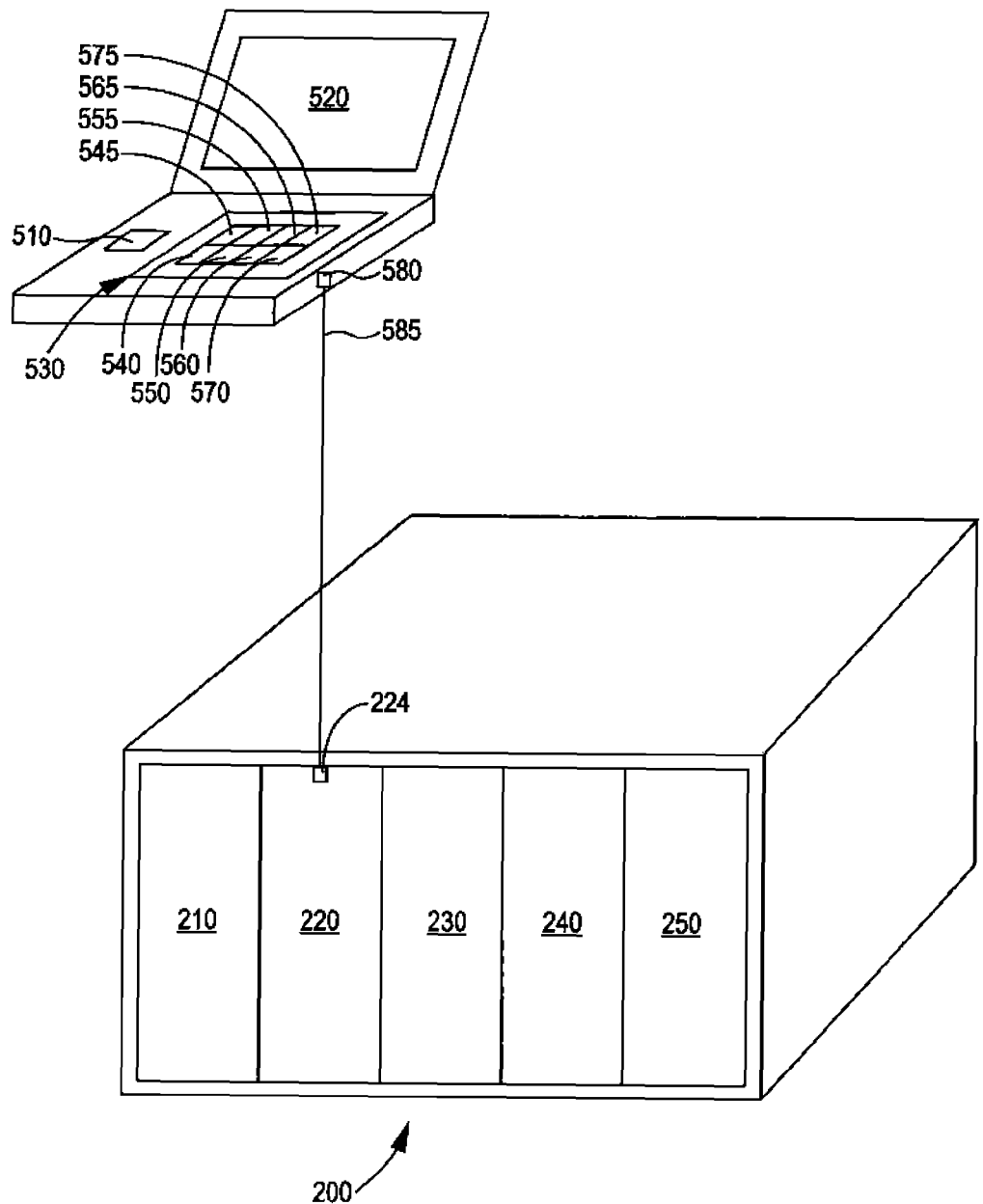
FIG. 2C shows the storage server of FIG. 2A in communication with Applicants' test device.

In certain embodiments, the computing device of step 310 comprises a storage library, such as for example and without limitation storage library 100 (FIGS. 1A, 1B). In certain embodiments, the computing device of step 310 comprises a storage server, such as for example and without limitation storage server 200 (FIGS. 2A, 2B, 2C).

In step 320, the method places the computing device of step 310 in communication with the testing device of step 305. In certain embodiments, step 310 further comprises supplying a communication link, such as communication link 585 (FIGS. 1B, 2C), wherein the computing device of step 310 communicates with the testing device of step 305 via the communication link. In certain embodiments, the communication link utilizes an I/O protocol, including without limitation, a fibre channel loop, SCSI (Small Computer System Interface), iSCSI (Internet SCSI), TCP/IP, SAS (Serial Attach SCSI), Fibre Channel, SCSI over Fibre Channel, Ethernet, Fibre Channel over Ethernet, Infiniband, and Serial Advanced Technology Attachment SATA.

In step 330, the method identifies an (i)th physical object disposed in said computing device, wherein (i) is initially set to 1, and wherein (i) is greater than or equal to 1 and less than or equal to (M). In certain embodiments, step 330 is performed by the testing device of step 305.

In step 340, the method determines if the plurality of test procedures of step 305 comprises one or more test procedures associated with the (i)th physical object of step 330. In certain embodiments, step 340 is performed by the testing device of step 305.

If the method determines in step 340 that the plurality of test procedures of step 305 do not comprise one or more test procedures associated with the (i)th physical object of step 330, then the method transitions from step 340 to step 370. Alternatively, if the method determines in step 340 that the plurality of test procedures of step 305 comprises one or more test procedures associated with the (i)th physical object of step 330, then the method transitions from step 340 to step 350 wherein the method adds the one or more (i)th test procedures identified in step 340 to a test algorithm under preparation, such as for example test algorithm 555 (FIGS. 1B, and 2C). In certain embodiments, step 350 is performed by the testing device of step 305.

In step 360, the method adds one or more test parameters, and one or more nominal test results, associated with the one or more (i)th test procedures to the test algorithm, such as for example test algorithm 555 (FIGS. 1B, and 2C). In certain embodiments, step 360 is performed by the testing device of step 305.

In step 370, the method determines if (i) equals (M), i.e. if all the physical objects disposed in the computing device of step 310 have been examined. In certain embodiments, step 370 is performed by the testing device of step 305. If the method determines in step 370 that (i) is not equal to (M), then the method transitions from step 370 to step 380 wherein the method increments (i) by unity. In certain embodiments, step 380 is performed by the testing device of step 305. The method transitions from step 380 to step 330 and continues as described herein.

If the method determines in step 370 that (i) does equal to (M), then the method transitions from step 370 to step 390 wherein the method saves the newly-formed platform-specific test algorithm, such as example platform-specific test algorithm 575 (FIGS. 1B, and 2C). In certain embodiments, in step 390 the method writes the platform-specific test algorithm to the computer readable medium disposed in the test device. The method transitions from step 490 to step 440 (FIG. 4).

Figure 4:
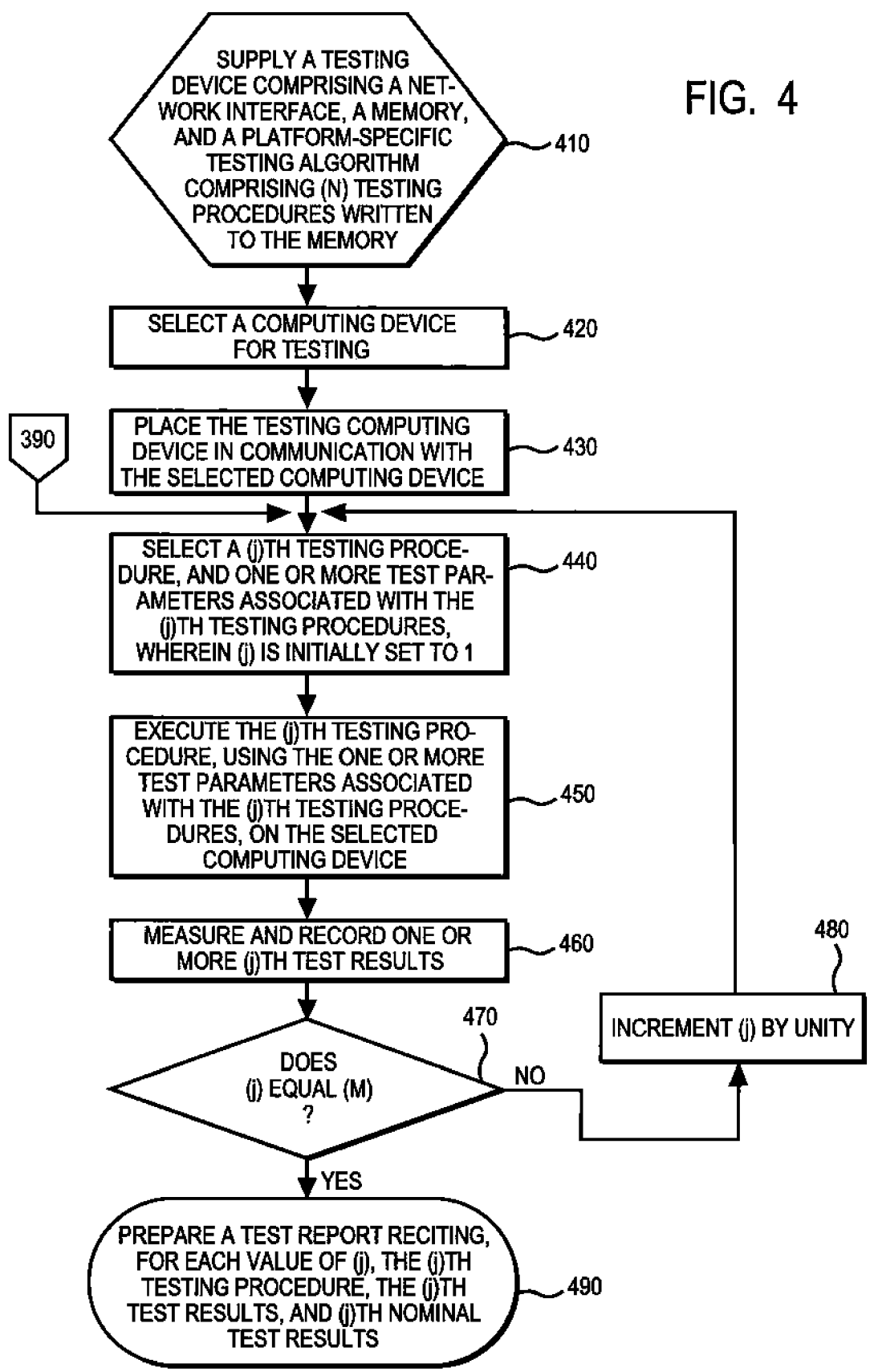
FIG. 4 is a flowchart summarizing the steps of Applicants' method to use the platform-specific test for computing hardware.

Referring now to FIG. 4, in step 410 the method supplies a test device, such as test device 500 (FIGS. 1B, 2C), comprising a processor, such as processor 510 (FIGS. 1B, 2C), a network interface, such as network interface 585 (FIGS. 1B, 2C), a computer readable medium, such as computer readable medium 530 (FIGS. 1B, 2C), a platform-specific test algorithm comprising (N) test procedures, such as for example the plat-form specific test algorithm 575 (FIG. 1B) saved in step 390 in computer readable medium 530. Each of those (N) test procedures is associated with one or more test parameters, such as test parameters 560 (FIGS. 1B, 2C), and with one or more nominal test results, such as nominal test results 565 (FIGS. 1B, 2C), wherein each of those one or more test parameters and each of the one or more nominal test results, are encoded in the computer readable medium disposed in the testing device.

In step 420, the method selects a computing device for testing, wherein the platform-specific test algorithm of step 410 has been designed to test a plurality of physical objects disposed in the computing device of step 420. Such physical objects comprise, for example and without limitation, host adapters, device adapters, processors, memory devices, communication buses, storage devices, data caches, and the like.

In certain embodiments, the computing device of step 420 comprises a storage library, such as for example and without limitation storage library 100 (FIGS. 1A, 1B). In certain embodiments, the computing device of step 310 comprises a storage server, such as for example and without limitation storage server 200 (FIGS. 2A, 2B, 2C).

In step 430, the method places the computing device of step 420 in communication with the testing device of step 410. In certain embodiments, step 430 further comprises supplying a computer network, wherein the computing device of step 310 communicates with the testing device of step 305 via the network. In certain embodiments, the network utilizes any sort of I/O protocol, including without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

In step 440, the method selects a (j)th test procedure, and one or more test parameters associated with that (j)th test procedure, wherein (j) is greater than or equal to 1 and less than or equal to (N), and wherein (j) is initially set to 1. In certain embodiments, step 440 is performed by the test device of step 410.

In step 450, the method executes on the selected computing device of step 420 the (j)th test procedure of step 440 using the associated test parameters of step 440. In certain embodiments, step 450 is performed by the test device of step 410. In step 460, the method measures and records one or more (j)th test results. In certain embodiments, step 460 is performed by the test device of step 410.

In step 470, the method determines if (j) equals (N), i.e. if all the test procedures written to the test algorithm of step 410 have been executed on the computing device of step 420. In certain embodiments, step 470 is performed by the test device of step 410. If the method determines in step 470 that (j) does not equal (N), i.e. all the test procedures written to the test algorithm of step 410 have not been executed on the computing device of step 420, then the method transitions from step 470 to step 480 wherein the method increments (j) by unity. In certain embodiments, step 470 is performed by the test device of step 410. The method transitions from step 480 to step 440 and continues as described herein.

If the method determines in step 470 that (j) does equal (N), i.e. all the test procedures written to the test algorithm of step 410 have been executed on the computing device of step 420, then the method transitions from step 470 to step 490 wherein the method prepares a test report reciting, for each value of (j), the (j)th test procedure, the (j)th actual test results, and the (j)th nominal test results. In certain embodiments, step 470 is performed by the test device of step 410.

In certain embodiments, step 490 further comprises supplying a visual display device in communication with the test device of step 410, disposing that visual display device adjacent the selected computing device of step 420, and visually displaying the test report on the visual display device. In certain embodiments, step 490 further comprises supplying a printer device in communication with the test device of step 410, disposing that printer device adjacent the selected computing device of step 420, and printing hard copy version of the test report on the printer device.

In certain embodiments, individual steps recited in FIGS. 3 and 4 may be combined, eliminated, or reordered.

In certain embodiments, Applicants' invention includes instructions, such as instructions 570 (FIGS. 1B, 2C), residing in computer readable medium 530 (FIGS. 1B, 2C), wherein those instructions are executed by a processor, such as processor 510 (FIGS. 1B, 2C), to perform one or more of steps 330, 340, 350, 360, 370, 380, and/or 390, recited in FIG. 3, and/or one or more of steps 440, 450, 460, 470, 480, and/or 490, recited in FIG. 4.

In other embodiments, Applicants' invention includes instructions residing in any other computer program product, where those instructions are executed by a computer external to, or internal to, data storage system 100 (FIGS. 1A, 1B), or storage server 200 (FIGS. 2A, 2B, 2C), to perform one or more of steps 330, 340, 350, 360, 370, 380, and/or 390, recited in FIG. 3, and/or one or more of steps 440, 450, 460, 470, 480, and/or 490, recited in FIG. 4. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. An article of manufacture comprising a processor, a non-transitory computer readable medium, a plurality of test procedures encoded in said computer readable medium, a test algorithm encoded in said computer readable medium, a network interface, and having computer readable program code disposed therein to create and use a platform specific test method for computing hardware, the computer readable program code comprising a series of computer readable program steps to effect:

placing a storage server comprising a first processor module comprising a plurality of first processors in communication with a first plurality of random access memory (RAM) storage assemblies, a second processor module comprising a plurality of second processors in communication with a second plurality of RAM storage assemblies, and a data storage module comprising one or more data storage devices;

determining a physical configuration for said storage server, wherein said physical configuration comprises a plurality of physical objects including processors, memory devices, and storage devices; and designing a test algorithm to test the physical objects comprising said physical configuration.

2. The article of manufacture of claim 1, said computer readable program code further comprising a series of computer readable program steps to effect:

retrieving a plurality of test procedures;

determining if said plurality of test procedures comprises one or more test procedures associated with each of said physical objects;

operative if said plurality of test procedures comprises one or more test procedures associated with a physical object:

adding said one or more test procedures associated with that physical object to a test algorithm;

saving said test algorithm.

3. The article of manufacture of claim 2, said computer readable program code further comprising a series of computer readable program steps to effect:

selecting, for each value of (j), from said test algorithm a (j)th test procedure, and one or more test parameters associated with said (j)th test procedure and one or more nominal test results associated with said (j)th test procedure, wherein said test algorithm comprises (N) test procedures, and wherein (j) is greater than or equal to 1 and less than or equal to (N), and wherein (N) is greater than or equal to 1;

executing said (j)th test procedure using said one or more test parameters associated with said (j)th test procedure;

measuring one or more (j)th actual test results;

storing in said computer readable medium said one or more (j)th actual test results.

4. The article of manufacture of claim 3, said computer readable program code further comprising a series of computer readable program steps to effect displaying, for each value of (j), said (j)th test procedure, said (j)th nominal test results, and said (j)th actual test results.

5. The article of manufacture of claim 4, wherein a visual display device in communication with said article of manufacture is disposed adjacent said storage server, wherein said computer readable program code to display said test results further step comprises a series of computer readable program steps to effect visually displaying on said visual display device, for each value of (j), said (j)th test procedure, said (j)th nominal test results, and said (j)th actual test results.

6. The article of manufacture of claim 4, wherein a printer device in communication with said article of manufacture is disposed adjacent said storage server, wherein said computer readable program code to display said test results further step comprises a series of computer readable program steps to effect printing a test report reciting, for each value of (j), said (j)th test procedure, said (j)th nominal test results, and said (j)th actual test results.

7. The article of manufacture of claim 4, wherein said computer readable program code to place said storage server in communication with said test device further comprises a series of computer readable program steps to effect placing said storage server in communication with said test device via the Internet.

8. The article of manufacture of claim 7, wherein said storage server is disposed at a first geographic location and wherein said test device is disposed at a second geographic location, wherein said first geographic location differs from said second geographic location.

* * * * *